United States Patent Office 2,918,461
Patented Dec. 22, 1959

2,918,461

PURIFYING AFTER-TREATMENT FOR POLYMERIZED OLEFINS PREPARED WITH CATALYTIC METAL COMPOUNDS

John M. Flynn, Midland, Mich., assignor to The Dow Chemical Company, Midland, Mich., a corporation of Delaware No Drawing. Application January 9, 1957
Serial No. 633,197

5 Claims. (Cl. 260—94.9)

This invention has reference to an improved purifying treatment that advantageously may be performed subsequent to the inactivation of the catalyst residue in polymerized olefinic and other ethylenically unsaturated materials of the type that have been prepared with certain catalytic metal compounds, in order to improve the color characteristics of the polymeric products, particularly during their ensuing fabrication.

Various olefins and other ethylenically unsaturated materials, particularly ethylene and propylene, may be polymerized (even as relatively impure materials) to high molecular weight, essentially linear, macromolecular polymeric compounds by emulation of a procedure that is in general accordance with a process which was first proposed by Dr. Karl Ziegler and his associates in Germany. In this process, as has been described in Belgian Patent No. 533,362, mixtures of strong reducing agents, such as aluminum alkyls, with a compound selected from the group consisting of compounds of groups IV–B, V–B and VI–B metals of the Mendeléeff Periodic System, including thorium and uranium, are employed as catalysts in a peculiar catalyst system for the polymerization. Polyethylenes, for example, having apparent molecular weights (as may be determined by observation of such of their intrinsic properties as melt viscosity and the like) that are usually well in excess of 20,000 and generally greater than about 40,000 and which frequently may be in the range from 100,000 to 3,000,000 can be manufactured by polymerizing ethylene gas under the influence of such unique catalyst systems.

Pursuant to the preferred comprehension of the Ziegler process as it is disclosed in the referred-to Belgian patent, relatively low temperatures may advantageously be utilized for the preparation of such polymeric materials. Although other techniques for performing the reaction under higher pressures and at higher temperatures may be suitably employed, the ethylene gas or other olefin monomer may be efficiently polymerized under the influence of the indicated varieties of catalyst systems at temperatures beneath about 100° C., preferably in the neighborhood of 50° C., and under pressures of less than about 100 atmospheres, preferably in the neighborhood of 1 to 10 atmospheres. A finely-divided, particulate, fluffy polymer product is generally obtainable in this way. Any of a variety of inert liquid media may be employed as vehicles during the polymerization including benzene, hexane and other low boiling, non-polymerizable hydrocarbon solvents, as have been discussed in the referred-to disclosure.

The polyethylenes and other polyolefins prepared under the influence of catalyst systems patterned after the varieties adapted for employment in the identified Ziegler process have superior and highly desirable properties. Characteristically, as has been indicated, they are essentially linear polymeric structures that are usually found to be devoid of extensive side-chain networks. In instances where the basic recurring olefinic unit is a monomer other than ethylene, the substituent groups that occur along the molecular chain of such essentially linear polymeric materials are found, almost without exception, to be derived merely from whatever pendant portion may be contributed by the monomer itself. And polyethylene, for example, may itself be manufactured under the influence of Ziegler catalyst systems so as to contain less than 3.0 and even less than 0.03 methyl groups per 100 methylene groups in the polymer molecule. The practically completely linear, macromolecular polymer molecules are generally found to be crystalline almost to their melting points, which usually fall at least within and frequently exceed the 125–135° C. temperature range. The polymers are insoluble in most solvents at ordinary temperatures and have remarkable tendencies to be exceedingly strong and tenacious. Shaped articles formed with such varieties of polyethylene, for example, have tear strengths between about 1400 and 2800 pounds per square inch. Unstretched films prepared from such polyethylenes have tensile strengths in excess of about 2800 pounds per square inch and may be oriented by stretching to polyethylene film structures having tensile strengths as great as about 42,500 pounds per square inch.

The strong reducing agents which are employed with such salutary benefit in Zeigler-type catalyst systems include an assortment of aluminum trialkyls, such as aluminum trimethyl, aluminum tripropyl, aluminum triisobutyl and higher aluminum trialkyls as well as dialkyl aluminum halides and dialkyl aluminum hydrides. Salts of titanium, zirconium, vanadium, uranium, thorium and chromium may oftentimes be preferable to employ as the groups IV–B, V–B and VI–B metallic compounds in the catalyst system although salts of the remaining metals in these subgroups may also be employed. Compounds of these metals including their halogenides, oxyhalogenides, complex halogenides, freshly precipitated oxides and hydroxides and such organic compounds as alcoholates, acetates, benzoates, acetyl acetonates and the like may be used in such catalyst systems.

A particularly active mixture for catalyst systems that are in accordance with the Ziegler concept may be obtained by admixing a titanium or zirconium compound, such as a tetrachloride, oxychloride or acetyl acetonate with the reducing agent, such as an aluminum alkyl. The proportions of the catalyst admixture which may be employed satisfactorily may vary with circumstances and may also depend upon the degree of purity of the materials being polymerized and the particular conditions involved in the reaction that is being performed. In general, an amount of the catalyst admixture (based on the weight of the olefin monomer that is being polymerized) which is between about 0.01 and a few percent by weight is found to be a suitable quantity.

After polymerization under the influence of a Ziegler catalyst system, however, polyethylene and similar polymerized olefin products seem unavoidably to contain catalytically active residues from the admixed catalyst system that has been employed. The residues are not completely removed by the conventionally utilized post-polymerization treatment of polymeric materials prepared with Ziegler catalyst systems. Such post-polymerization treatments, according to the comprehension of the Ziegler process, may involve lixiviation of the catalyst residue-containing polymeric product to at least partially dissolve out or otherwise extract the heavy metal-including residue without solubilizing the polymer. The solvent extraction is sequentially performed after the polymerization product has been filtered from the reaction mass, preferably, as proposed by Dr. Ziegler, in the presence of air (which allegedly tends to lighten the color of the product). Liquid solvent substances that do not deleteriously affect or tend to dissolve the polymer and which have been proposed and utilized for such conventional post-polymerization treatments include such low molecular weight aliphatic alcohols as methanol, isopropanol and butanol, such hydrocarbon solvents as pentane and hexane and such other solvent substances as acetone. When high catalyst concentrations are employed in a polymerization process that is conducted with Ziegler-type catalyst systems, some of the metallic compounds may be removed from the polymeric product in a post-polymerization extraction with methanolic hydrochloric acid followed by washings with other of the indicated types of solvents.

It has been observed that the presence of metallic catalytic residues in polymeric materials that have been prepared under the influence or with the assistance of Ziegler-type catalyst systems tends to impart certain undesirable characteristics to the polymers. For example, such polymers, when subsequently molded or otherwise shaped in the presence of heat at elevated temperatures, tend to become darker than is desirable due to the presence (and apparent heat reactivity) of the catalyst residue. In addition, the presence of certain metallic catalyst residues in the polymers, particularly when the residue is a metal halide such as a titanium or vanadium chlorides and the like, tends to produce extremely corrosive impurities in the polymer, such as hydrogen chloride and the like. Such impurities may quite often have a highly deleterious influence upon most of the ferrous metal materials of construction which are commonly utilized in the blending, extruding and molding apparatus that is commonly employed during the forming and shaping of the polymer into finished articles. Their behavior in this manner seriously restricts the utility and general desirability of polymers that have been manufactured with the use of Ziegler-type catalyst systems.

It has been found to be extremely beneficial and particularly advantageous to treat polyethylene and other polymers prepared under the influence of Ziegler-type catalyst systems in ways other than those contemplated in such disclosures (as in the referred-to Belgian patent) in order to lessen or, for all practical purposes, eliminate their tendency to darken, degrade or to exert a corrosive influence upon being shaped, molded or otherwise fabricated into desired structures. This has been accomplished by various means and expedients, among which are treatments of the catalyst residue-containing polymer that are adapted to inactivate the catalyst residue in such a manner that the possible harmful consequences of its presence in the polymer product are efficaciously nullified. One treatment of this variety that is particularly desirable to employ and whose effect may be characterized as being one of "quenching" or "killing" the catalyst residue may be in accordance with the Stabilizing Treatment for Polymerized Olefins Prepared with Catalytic Metal Compounds that has been disclosed in the copending application of Richard O. Whipple and Charles R. Pfeifer having Serial No. 530,398 which was filed on August 24, 1955. In that procedure, active hydrogen compounds (including, among others, water and aliphatic alcohols) are employed to contact the catalyst residue-containing polymer after it has been polymerized under the influence of a Ziegler-type catalyst system and before there is permitted any exposure of the polymerized product to air or other oxygen-containing atmosphere. Such a catalyst residue "quenching" treatment may also be performed in accordance with the improvement that has been disclosed by Charles R. Pfeifer and Mark R. Kinter in their copending application having Serial No. 551,906 for an Improved Treatment for Stabilizing Polymerized Olefins Prepared with Catalytic Metal Compounds, which was filed on December 8, 1955, wherein the catalyst residue-containing polymer is contacted with a vaporized active hydrogen compound, advantageously in a purging stream thereof, before permitting exposure of the polymer product to air.

Despite the great benefit that is involved in the utilization of the indicated variety of quenching treatments with active hydrogen compounds, it has been found desirable to subsequently after-treat the quenched polymer in order to further purify or "clean-up" the product. The object of such purifying "clean-up" is generally to further reduce the residual content of the quenched catalyst, primarily to ensure a low content of halogen (such as chlorine) when a halogen-including catalyst residue has been derived from the Ziegler-type catalyst system that was utilized for the polymerization. The usual after-treating purifying "clean-up" of the polymer that is employed subsequent to the catalyst inactivation with an active hydrogen compound involves an extensive and complex series of washing steps, generally in water and aqueous detergent solutions, which may most effectively be accomplished with the assistance of vigorous agitation, as by conducting the washing in a centrifuge, followed by drying of the thoroughly treated polymer product. Thus, a typical quenched catalyst residue-containing polyethylene product may, after treatment with the active hydrogen compound, be subject to a hot water wash in a centrifuge; followed by a hot wash in an aqueous detergent solution in a centrifuge; followed by another hot water wash in a centrifuge; and terminated by a double pass through flash drying apparatus. The indicated after-quench-treatment, when conducted on polyethylene that contains a chlorine-including catalyst residue, generally produces a polymer product that contains less than about 200 parts per million by weight (p.p.m.) of residual chloride. It also exerts a noticeable improvement in the color of the polymer product that may be obtained in comparison to polymer that has merely been catalytically inactivated by treatment with an active hydrogen compound.

It would be a great advantage, and it is among the principal objectives of the present invention, to provide a simplified and exceptionally expedient process for after-treating polymerized olefin products, particularly polyethylene, that have been prepared under the influence of Ziegler-type catalyst systems, particularly those that provide halogen (especially chlorine) including catalyst residues in the polymer product in order to efficiently purify and "clean-up" the polymer product after it has been catalytically inactivated and quenched by treatment with an active hydrogen compound. It would be especially desirable if such a simplified after-treating process were adapted to provide a polymer product having even better color characteristics than are obtained in polymers that have been after-treated in the indicated complex manner. It would be particularly beneficial if the simplified after-treating "clean-up" process involved minimum requirements for apparatus and reduced the labor and attention that would necessarily attend such an operation.

To the accomplishment of these and related ends, polymerized olefinic products, particularly polyethylene, that have been prepared under the influence of a Ziegler-type catalyst system and which have been catalytically inactivated or quenched after their polymerization with an active hydrogen compound before being permitted to be exposed to air or other sources of oxygen may be effectively and efficiently after-treated in order to be purified or "cleaned-up," especially when a halogen-including and particularly when a chlorine-including catalyst residue is involved, by forming the quenched particulate polymer product into a mass that is adapted to be fluidized upon being contacted by or with a passing stream of fluid (as by placing it in typical fluid bed apparatus of conventional and known design) and fluidizing said mass of polymer by a contacting stream of fluid selected from the group consisting of steam, hot air and mixtures thereof that is passed upwardly through said polymer mass at a fluidizing rate that, advantageously, when the particles have appropriate physical dimensions, may be between about 0.15 and 0.3 linear feet per second when air is employed and in the neighborhood of 0.20–0.25 linear feet per second for steam.

Advantageously, the after-treatment, may be conducted at a temperature between about 90 and 115° C., especially when polyethylene is being "cleaned-up." Of course, when steam is utilized in the after-treatment, it is preferred to maintain the temperature above 100° C. to avoid difficulties with condensation and wet polymer product. More advantageously, the temperature for the after-treatment is maintained between about 100 and 110° C. The after-treatment may be suitably terminated when the mass of polymer in the fluidized bed (or individual or partial portions of such mass) have been subjected to the fluidizing stream of steam or hot air, or both, for a period of time that is between about 5 and 15 minutes. When steam is solely utilized for the fluidizing stream, an after-treatment between about 5 and 10 minutes may be more advantageous for accomplishment of the intended purpose. Hot air after-treatments are generally more advantageous when conducted for 10 to 15 minutes. During the fluidization of the polymer, its volume increase will be found to vary, in the usual manner, with the rate of flow of the fluid being passed therethrough. However, optimum results in the after-treatment may frequently be obtained when about one and one-half times the minimum fluidizing flow rate (which may vary with particular fluids or fluid mixtures) is effected of the particular fluid that is utilized. In such cases, about a fivefold increase in apparent polymer volume may normally be observed. As is apparent, the minimum fluidizing flow rate for a particular fluid under given conditions may be found to occur without the indicated advantageous ranges.

Alternate streams of steam and hot air or their various mixtures may be utilized in any desired sequence. In many cases, especially when hot air is employed as the fluidizing stream, the "cleaned-up" after-treated polymer may be obtained in a thoroughly dry condition in which it is free from any of the polymerization vehicle, such as hexane, that may have remained with it after its polymerization throughout the quenching treatment with an active hydrogen compound. It this connection, although a dry and polymerization vehicle-free quenched polymer may be satisfactorily after-treated in the practice of the invention, it is permissible and generally an advantage to after-treat a quenched polymer that is still wet with the vehicle that was employed during its polymerization. Such a procedure, as is obvious, eliminates an intermediate drying step. Of course, if desired or necessary, the after-treated polymer can be subsequently dried in any desired manner. The after-treatment may be accomplished by batchwise or continuous procedures that are performed in conventional manners for fluid bed operations. The latter technique may be especially beneficial when a polymer that is wet with polymerization vehicle is being after-treated and solvent recovery from the polymer is a desideration.

Practice of the present invention advantageously facilitates a one-step after-treatment in order to purify and "clean-up" a quenched polymeric product that has been prepared by polymerizing olefins under the influence of Ziegler-type catalyst systems. Its effect, especially with halogen-including (particularly chlorine-including) catalyst residue-containing polymers is at least as good as the above described multiple-step after-treatment procedure for purposes of reducing the content of certain catalyst residue constituents, particularly halogens, in the polymer product to highly desirable minimum levels. This is assumed, upon the basis of reasonable information and belief, to be due to the selective oxidation upon the catalyst residue that is accomplished by the fluidizing stream of steam or air, or both, in the practice of the purifying after-treatment of the present invention. In addition, the color of the "cleaned-up" polymer product after a fluidized bed treatment according to the invention is frequently even more improved, oftentimes by at least one or two definite and discernible grades or noticeable shades of color, than what is attained in the heretofore commonly employed multiple-step purifying after-treatment.

By way of further illustration, excellent results were obtained in each of a number of runs in which a quenched polymer product was after-treated for additional purification in fluidized beds using fluidizing streams of steam, hot air, mixtures of steam and hot air and various alternating streams of steam and hot air in different sequences using various combinations of operating conditions with the ranges that have been described in the foregoing as being advantageous. In each case, the polymer that was after-treated had been manufactured by polymerizing relatively pure ethylene according to the herein described Ziegler process using admixtures of aluminum triisobutyl and titanium tetrachloride in the ziegler-type catalyst systems that were employed for the polymerizations. Each of the reactions were conducted in a large volume of hexane as a polymerization vehicle and each of the polymer products, after being polymerized and before being permitted to be exposed to air, were quenched in either isopropanol or live steam to inactivate the catalyst residue according to the disclosures of the above-identified U.S. applications Serial Nos. 530,398 and 551,906. The residual chloride contents of the quenched polymers prior to after-treatment varied from about 1,000 to 5,000 p.p.m. In each case, about a two pound quantity of the quenched polymer, that, as usual, had been obtained in a finely-divided particulate form, and which was damp with hexane (containing about 2 parts by weight of hexane to each three parts by weight of polymer) was charged to a fluid bed apparatus which consisted of a heated vertical column having a thirty inch height and an eight inch internal diameter. A wire mesh screen in the lower portion of the column was utilized as a bed support and a fluid diffusing packing section of one-half inch Rashig rings was provided above the fluid inlet and beneath the support screen. All of the quenched polymer product that after-treated in accordance with the invention was found to have contents of less than about 200 p.p.m. of residual chloride. In addition, their color was generally at least one to two shades better (noticeable visually) than the color of similar polymer that had been after-treated by the described five-step water and detergent solution technique.

Certain changes and modifications in the practice of the present invention can be readily entered into without substantially departing from its intended spirit and scope. Hence, it is to be fully understood that all of the foregoing be construed and interpreted as being merely illustrative of certain embodiments of the invention.

What is claimed is:

1. In a process wherein a polymerized, ethylenically unsaturated material that has been prepared with a Ziegler-type catalyst system is being purified after having been quenched with an active hydrogen compound to inactivate the catalyst residue before the polymer product is permitted to be exposed to air, said Ziegler-type catalyst system being of the class comprised of admixtures of (a) a strong reducing agent selected from the group consisting of aluminum trialkyls, dialkyl aluminum halides and dialkyl aluminum hydrides and (b) a compound selected from the group consisting of halogenides, oxyhalogenides, complex halogenides, freshly precipitated oxides and hydroxides, alcoholates, acetates, benzoates and acetyl acetonates of metals of Groups IV–B, V–B and VI–B of the Mendeleeff Periodic System, the improved after-treating step for the indicated purpose which comprises forming the quenched polymer product into a particulate mass that is adapted to be fluidized upon being contacted with a passing stream of fluid wherein the particles of quenched polymer are of such a size that the fluidizing rate of said contacting fluid is between about 0.15 and 3.0 linear feet per second and fluidizing said mass of polymer by a contacting stream of fluid selected from the group consisting of steam, hot air and mixtures thereof that is passed upwardly through said polymer mass at a fluidizing rate and at a temperature between 90° C. and about 115° C.

2. The process of claim 1, wherein the polymer is contacted with the fluidizing stream of contacting fluid for a period of time between about 5 and 15 minutes.

3. The process of claim 1, wherein the fluidizing stream of fluid that contacts the fluidized bed of quenched, suitably particulate polymer is steam which is passed through said fluidized bed at a temperature of at least 100° C. and a rate of about 0.20 and 0.25 linear feet per second for a period of time between about 5 and 10 minutes.

4. The process of claim 1, wherein the fluidizing stream of fluid that contacts the fluidized bed of quenched, suitably particulate polymer is hot air which is passed through said fluidized bed for a period of time between about 10 and 15 minutes.

5. An after-treatment in a process according to claim 1 that is performed on polyethylene that contains a chlorine-including catalyst residue.

References Cited in the file of this patent

UNITED STATES PATENTS

| | | |
|---|---|---|
| 2,187,877 | Ferris et al. | Jan. 23, 1940 |
| 2,691,647 | Field et al. | Oct. 12, 1954 |
| 2,761,769 | Elder | Sept. 4, 1956 |
| 2,838,477 | Roelen et al. | June 10, 1958 |

FOREIGN PATENTS

| | | |
|---|---|---|
| 533,362 | Belgium | May 15, 1955 |